United States Patent
Chen et al.

(10) Patent No.: US 6,241,895 B1
(45) Date of Patent: Jun. 5, 2001

(54) SPECTRUM WATER GENERATOR AND METHOD OF PROCESSING WATER USING SAID SPECTRUM WATER GENERATOR

(75) Inventors: Ben Chen; Junling Chen; Xianfeng Chen; Yi Zhao, all of Guangzhou (CN)

(73) Assignee: Guangdong Junfeng Industry & Commerce Co., Ltd., Guang Zhou (CN)

( * ) Notice: Subject to any disclaimer, the term of this patent is extended or adjusted under 35 U.S.C. 154(b) by 0 days.

(21) Appl. No.: 09/321,748

(22) Filed: May 28, 1999

(30) Foreign Application Priority Data

May 30, 1998 (CN) .............................. 98 1 13228

(51) Int. Cl.[7] .............................. B01D 35/06; C02F 1/48
(52) U.S. Cl. .............................. 210/695; 210/222
(58) Field of Search .................... 210/222, 223, 210/695; 204/660–664

(56) References Cited

U.S. PATENT DOCUMENTS

| | | | |
|---|---|---|---|
| 2,939,830 | * | 6/1960 | Green et al. . |
| 4,122,005 | * | 10/1978 | Forssberg et al. . |
| 4,528,096 | * | 7/1985 | Pfister et al. ............ 210/222 |
| 4,892,655 | * | 1/1990 | Makovec ................ 210/222 |
| 4,938,875 | * | 7/1990 | Niessen ................. 210/695 |
| 5,089,128 | * | 2/1992 | Garaschenko et al. ...... 210/222 |
| 5,236,670 | * | 8/1993 | Iwata . |
| 5,247,179 | * | 9/1993 | Tachibana . |
| 5,925,324 | * | 7/1999 | Greer . |

FOREIGN PATENT DOCUMENTS 57-94519 * 6/1982 (JP) .

* cited by examiner

Primary Examiner—W. L. Walker
Assistant Examiner—Marianne S. Ocampo
(74) Attorney, Agent, or Firm—Lowe Hauptman Gilman & Berner, LLP

(57) ABSTRACT

The present invention discloses a method and a spectrum water generator for processing water with an electromagnetic field, wherein the spectrum water generator comprises a water pipe 1, iron core 2, coil 3 and control circuit, said iron core 2 is a ring-form iron core 2 with air gap 4, said iron core 2 is made up of D44 silicon-steel sheets; said water pipe 1 is plugged in said air gap 4; said coil 3 is placed at both sides of said air gap 4, the input and output ends $L_1$, $L_2$ of said coil 3 are connected with control circuit, the control circuit is connected with power supply. With the spectrum water generator of the present invention, tap water and drinking water can be processed into high-quality water of high oxygen intensity, smaller water particles, and permeates into the human body through drinking or shower, thus improves the micro-circulation of human body and achieves the goal of heath keeping and disease treatment.

5 Claims, 3 Drawing Sheets

SPECTRUM WATER GENERATOR AND METHOD OF PROCESSING WATER USING SAID SPECTRUM WATER GENERATOR

TECHNICAL FIELD

The present invention relates to a device which processes water with electromagnetic field or, particularly relates to a spectrum water generator which produces specially processed drinking water for therapy and health care.

BACKGROUND

The human body may be regarded as a biological radiation source that can emit various kinds of information to the atmosphere around us. Research shows, there exists an interaction between one human body and another human body, and a human body and nature. This interaction inspires people to seek for the most suitable way, which can benefit the human body more. Thus, it is proposed to use the theorem of bionics for simulating and producing suitable energy spectrum that applies to organs of the human body through the biochemical action and the combined response effect of cell and histology to improve the natural balance procedure and reach the goal of health care and disease treatment. Prior art magnetic water generator is an alternating magnetic field one. Water processed by such magnetic water generator is higher in energy and activity, and has certain effects on inflammation, calculus and other common diseases. However, since the frequency of electro-magnetic field used for processing water is far away from the frequency of the biological alternating electro-magnetic field inside human body, and field intensity can not reach the threshold value, thus the processed water can not further improve the bionic adjusting functionality inside the human body.

SUMMARY

The objective of the present invention is to overcome the existing drawbacks by providing a electromagnetic field producing device which produces magnetized water having a similar electromagnetic spectrum to the biological alternating electromagnetic field frequency inside the organs of the human body.

The present invention provides a spectrum water generator having an iron core, wherein the generator is a ring-form iron core with air gap and made up of D44 silicon-steel sheets. The coil is placed at both sides of said air gap, the input and output ends are connected with a control circuit, the control circuit is connected with a power supply, and said water pipe is plugged in said air gap. Further objectives and advantages of this invention will appear from the following description and the accompanying drawings.

PREFERRED EMBODIMENTS

Figure 1:
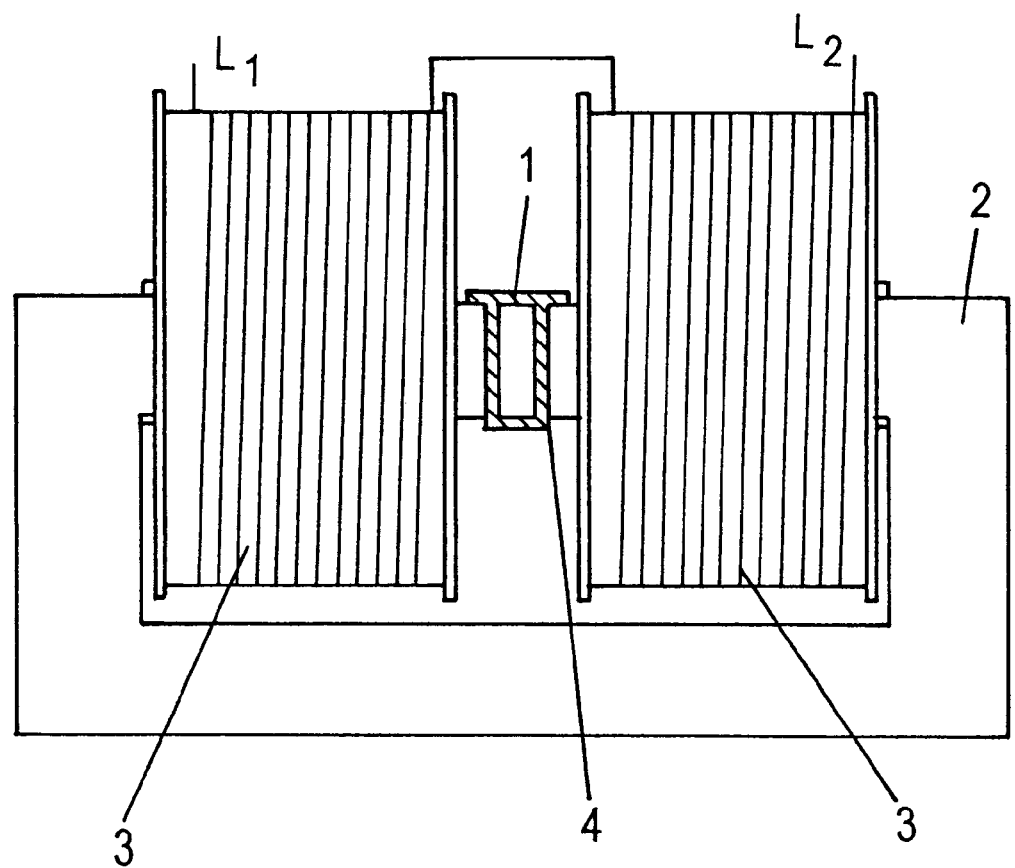
FIG. 1 is a sketch of the first embodiment of the spectrum water generator having a single water pipe according to the present invention.

FIG. 1 shows first embodiment of the spectrum water generator in the present invention. Said spectrum water generator includes water pipe1, iron core 2, coil 3 and control circuit (not shown in the figure). Said iron core 2 is a ring-form iron core with air gap 4 and is made up of D44 silicon-steel sheets, and, on iron cores 2 at both sides of air gap 4 are respectively placed a set of coil 3, the input and output ends $L_1$, $L_2$ of two sets of coils 3 in parallel or in series are connected with a control circuit, and the control circuit (not shown in the drawings) is connected with a power supply. Water pipe 1 is plugged in the air gap 4. When the spectrum water generator is powered on, the magnetic line of alternating electro-magnetic field orthogonally cut the flowing water in water pipe 1. This will lead to the mutual cutting between water particular field and electromagnetic field, causing the electro-magnetic energy to be transferred onto the water molecules, then splitting the water molecule groups and the water particles become smaller.

To guarantee the water processed by the spectrum water generator of the present invention has a desired spectrum, the current through coil 3 ranges from 0.1 to 1.0 ampere, and in dynamic state the magnetic induction intensity in the center of air gap 4 of iron core 2 ranges from 250 to 2500 gausses. When the generator is powered on, the frequency of current passing through the coils, kept in the range 50 to 350 hertz's. Thus the generator will produce magnetized water, which has a similar magnetic-field spectrum to the biological alternating electro-magnetic field frequency inside the organs of human body, and produce improved water.

In the practical application, in order to strengthen the resonance and increase the field intensity, water pipe 1 plugged in the air gap between two sets of coils 3 has a rectangular shape. The length of its shorter side $b_1$ is equal to the width of the air gap 4 of iron core 2 and is less than 6 mm, and the length of its longer side $b_2$ is equal to the width a of iron core 2. A better result will be achieved, if the iron core is made up of non-crystal soft magnetic material.

Figure 2:
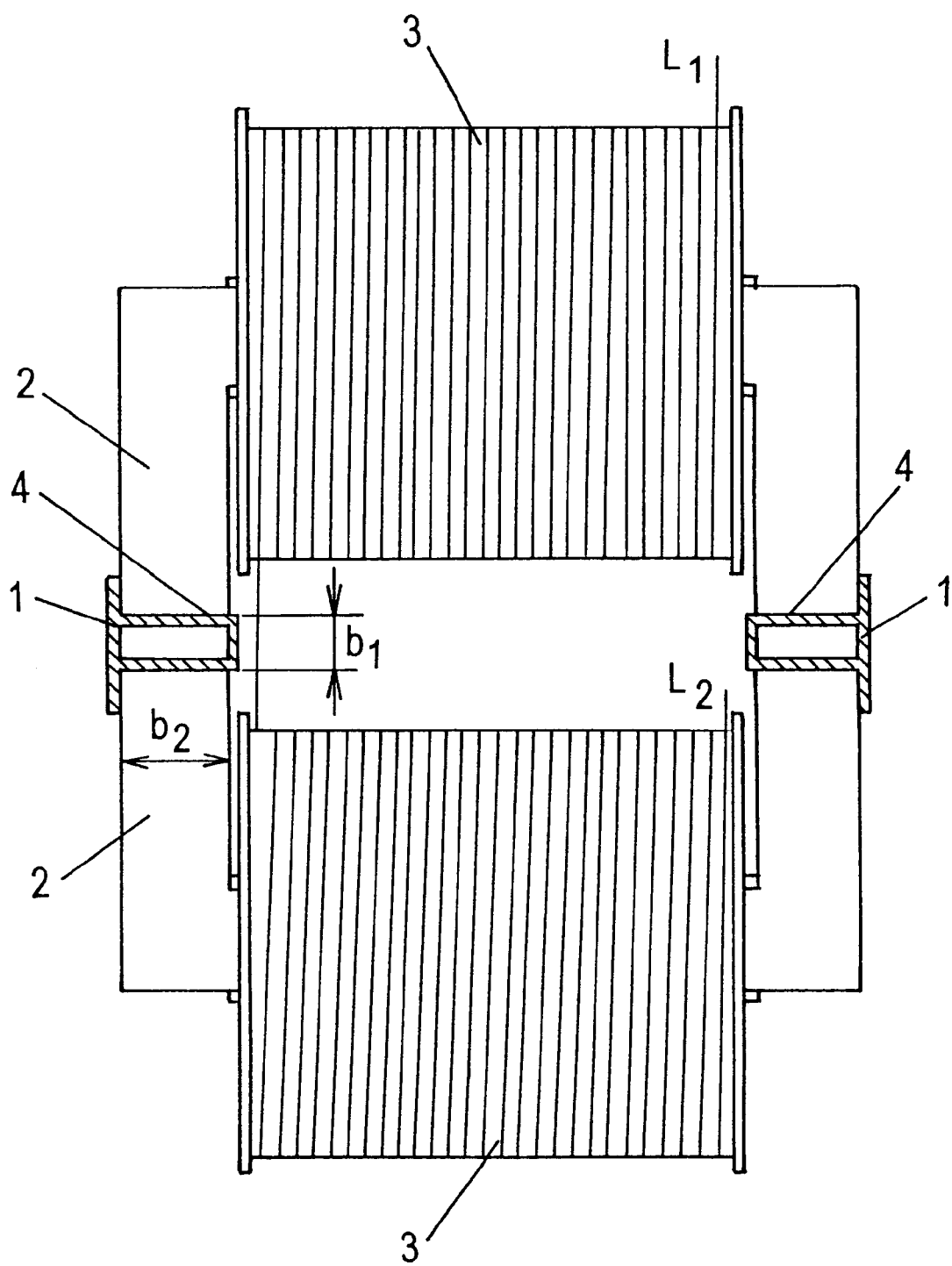
FIG. 2 is a sketch of the second embodiment of the spectrum water generator having two water pipes according to the present invention.

FIG. 2 shows the structure of the second embodiment of the spectrum water generator in the present invention. Its difference with the first embodiment lie in that the iron core 2 is a ring-form iron core 2 with two opposite air gaps 4, and the two sets of coils 3 are placed on both sides of the two air gaps 4 and have an equal distance from each of them. Since in the spectrum water generator are placed two sets of coils 3 and two water pipes 1, this structure is suitable for the conditioning of large amounts of water, e.g. household water.

Figure 3:
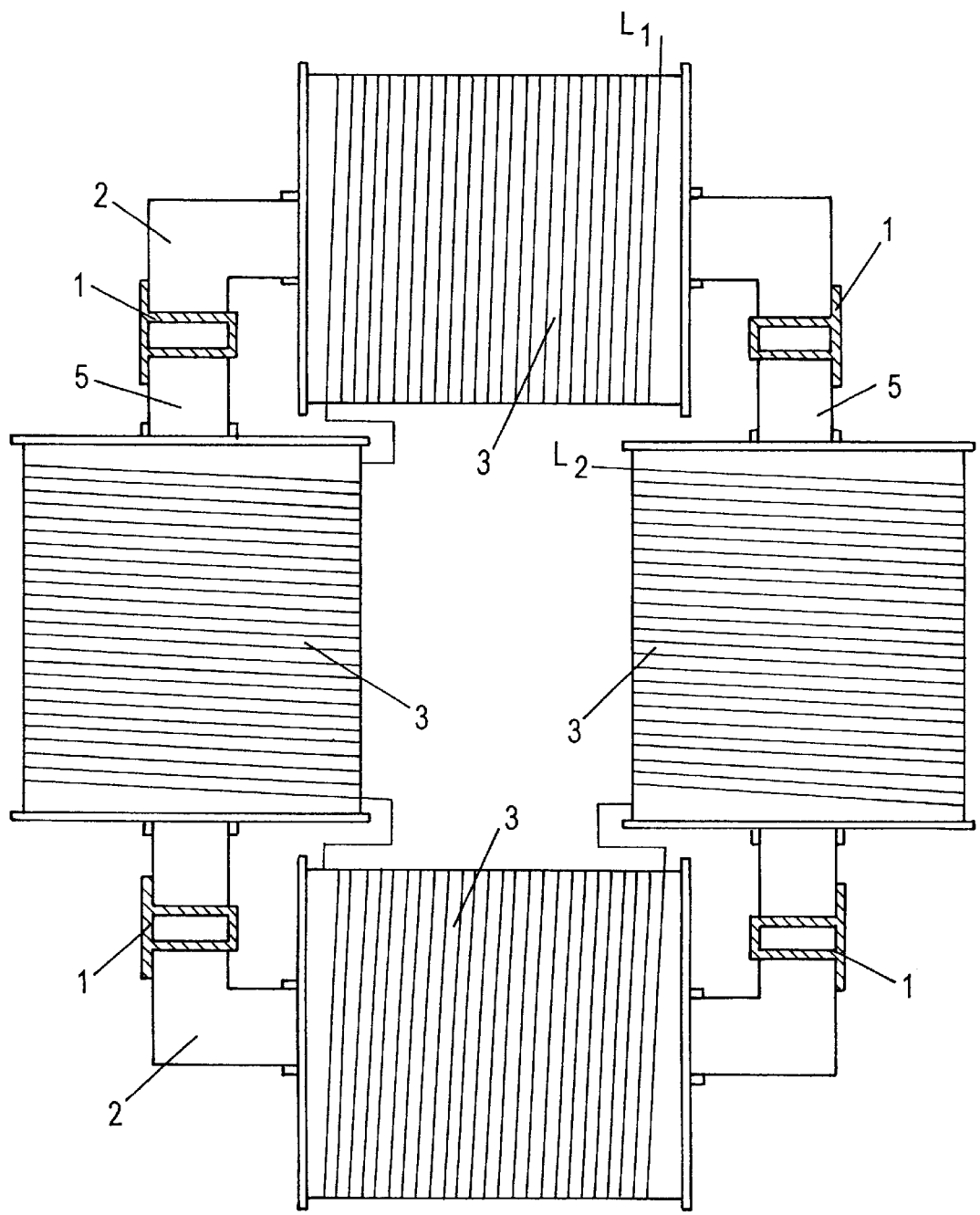
FIG. 3 is a sketch of the third embodiment of the spectrum water generator having four water pipes according to the present invention.

FIG. 3 is shows the third embodiment of the spectrum water generator in the present invention. Its difference with the second embodiment lies in: its iron core 2 is a ring-form iron core 2 with two pairs of opposite air gaps 4, between the two air gaps of each pair is a linear segment 5, the two pairs of coils 3 are placed respectively at the middle of the adjacent air gaps 4. In this structure, the spectrum water generator is equipped with four sets of coils 3 and four water pipes 1. Thus on the condition of same water cross section of water pipe 1, the spectrum water flux is three times as in the first embodiment of FIG. 1. Therefore, this structure is suitable for places requiring larger amount of water, e.g. sanatorium, rehabilitation center, hospital or household ablution water.

INDUSTRY APPLICABILITY

In comparison with general water, the water processed by the spectrum water generator of the present invention, e.g. tap water, its half breadth (frequency) of $^{17}O$-NMR nuclear magnetic resonance curve L becomes more narrow, the water particles become smaller, and its intrinsic frequency spectrum becomes more similar to biological spectrum. In addition, this spectrum water is richer in oxygen, the water molecules are in active status and have stronger surface tension and more powerful permeating ability, thus can be absorbed more easily, invoke resonance, and achieve the effects of activating cells and biological enzymes, purging oxygen free radical, improving micro-circulation, etc. Thus it can strengthen the bionic adjusting functionality of the human body itself, and cure illness and keep health.

The spectrum water generator of the present invention has a simple structure and a widely applicable range. The processed water can be used for drinking or shower, and provides the effect of illness treatment and health care on human body.

Clinical experiments show that it has yielded better effects on some patients to apply water produced by the spectrum water generator of the present invention.

Case 1:

Clinic observation objects: patients diagnosed to suffer from chronic pharyngitis or chronic tonsillitis, 30 persons, male 14, female 16.

Clinic symptoms: over two symptoms of pharynx ache, pharynx itch, tussiculation, foreign substance sense, hoarseness, etc., check reveals pharynx congestion, pharynx back walllymph follicle accretion, tonsil chronic congestion, adhesion.

Usage: stop medicine treatment and other local treatment during treatment period, everyone drinks 1000 ml spectrum water each day for two continuous weeks Result: recovery 73.33% obvious effect (symptoms obviously alleviated) 6.67% effective (symptoms slightly alleviated) 16.67% the whole effective rate is 96.7% no side-effect at all Case 2:

Clinic observation objects: patients diagnosed to suffer from oral ulcer, 21 persons, male 10, female 11. different periods from 3 months to 4 years.

Clinic symptoms: oral cavity mucosa anabrosis, ache on eating or speaking, belongs to non-tumor, non-specific infection Usage: everyone drinks 1000~2000 ml spectrum water each day for two continuous weeks, one week as a period of treatment Result: recovery (symptoms disappear and ulcer heals) 80.95% the whole effective rate is 95.23% no side-effect at all Case 3:

Clinic observation objects: patients diagnosed to suffer from constipation, 20 persons, male 7, female 13. different periods from 1month to 12 years.

Clinic symptoms: constipation, difficult in defecation, intermittent hematochezia, abdominal distension.

Usage: everyone drinks spectrum water six times a day, one time 200~300 ml, 7 days a period.

Result: recovery (symptoms disappear) 60% obvious effect (symptoms obviously alleviated) 15% effective (symptoms alleviated) 20% the whole effective rate is 95% no unhealthy effect found Case 4:

Clinic observation objects: patients diagnosed to suffer from urinary calculus, 38 persons, male 16, female 22.

Clinic symptoms: waist-ache, frequent micturition, urgency of micturition, erythrocyte, leucocyte and small quantity protein found in regular urine check.

Usage: everyone drinks 1000~2000 ml spectrum water each day, treatment and observation last two weeks Result: obvious effect (symptoms obviously alleviated, obviously less erythrocyte, leucocyte found in regular urine check) 52.6% effective (symptom alleviated to some extent) 42.1% the whole effective rate is 94.7% no unhealthy effect found While the description of the invention has been given with respect to a preferred embodiment, it is not to be constructed in a limited sense. Variations and modification will occur to those skilled in the art. Reference is made to the appended claims for a definition of the invention.

What is claimed is:

1. A method of processing water with an electromagnetic field in a spectrum water generator to produce specially processed water for therapy and heath care purposes, comprising the steps of:

introducing water into a water pipe of a spectrum water generator, wherein said spectrum water generator, comprising a water pipe (1), an iron core (2), a coil (3) and a control circuit, wherein said iron core (2) is a ring-form iron core (2) with an air gap (4), a width of said air gap is no more than 6 mm, and said iron core (2) is made up of silicon-steel sheets;

said water pipe (1) is plugged into said air gap (4);

said coil (3) is placed at both sides of said air gap (4) input and output ends (L1, L2) of said coil (3) are connected with said control circuit, said control circuit is adapted to be connected with a power supply; and processing the water by actuating the power supply to provide a current through the coil which ranges from 0.1 to 1.0 ampere, the magnetic induction intensity at a center of said air gap (4) of said iron core (2) dynamic state ranges from 250 to 2500 gauss and the current frequency of the control circuit is maintained within 50 to 350 hertz.

2. A spectrum water generator, comprising a water pipe (1), an iron core (2), a coil (3) and a control circuit wherein said iron core (2) is a ring-form iron core (2) with an air gap (4), a width of said air gap is no more than 6 mm, and said iron core (2) is made up of silicon-steel sheets; said water pipe (1) is plugged into said air gap (4); said coil (3) is placed at both sides of said air gap (4), input and output ends (L1, L2) of said coil (3) are connected with said control circuit, said control circuit is adapted to be connected with a power supply, wherein the current through coil (3) ranges from 0.1 to 1.0 ampere, the magnetic induction intensity at a center of said air gap (4) of said iron core (2) dynamic state ranges from 250 to 2500 gauss and the current frequency of the control circuit is maintained within 50 to 350 hertz, wherein the water pipe (1) plugged in said air gap (4) is of rectangular shape, the length of a shorter side thereof is equal to a width of the air gap (4) of the iron core (2), and the length of a longer side thereof is equal to a width of the iron core (2).

3. A spectrum water generator comprising a water pipe (1), an iron core (2), a coil (3) and a control circuit wherein said iron core (2) is a ring-form iron core (2) with an air gap (4), a width of said air gap is no more than 6 mm, and said iron core (2) is made up of silicon-steel sheets; said water pipe (1) is plugged into said air gap (4); said coil (3) is placed at both sides of said air gap (4), input and output ends (L1, L2) of said coil (3) are connected with said control circuit, said control circuit is adapted to be connected with a power supply, wherein the current through coil (3) ranges from 0.1 to 1.0 ampere, the magnetic induction intensity at a center of said air gap (4) of said iron core (2) dynamic state ranges from 250 to 2500 gauss and the current frequency of the control circuit is maintained within 50 to 350 hertz, wherein said ring-form iron core (2) is formed with two opposite air gaps (4), and two sets of said coils are placed on both sides of the two air gaps (4) and have an equal distance from each of them.

4. A spectrum water generator comprising a water pipe (1), an iron core (2), a coil (3) and a control circuit wherein said iron core (2) is a ring-form iron core (2) with an air gap (4), a width of said air gap is no more than 6 mm, and said iron core (2) is made up of silicon-steel sheets; said water pipe (1) is plugged into said air gap (4); said coil (3) is placed at both sides of said air gap (4), input and output ends (L1, L2) of said coil (3) are connected with said control circuit, said control circuit is adapted to be connected with a power supply, wherein the current through coil (3) ranges from 0.1 to 1.0 ampere, the magnetic induction intensity at a center of said air gap (4) of said iron core (2) dynamic state ranges from 250 to 2500 gauss and the current frequency of the control circuit is maintained within 50 to 350 hertz, wherein, said ring-form iron core (2) is formed with two pairs of opposite air gaps (4), between the two air gaps of each pair is a linear segment (5), and two pairs of said coils (3) are placed respectively at a middle of adjacent ones of the air gaps (4).

5. A spectrum water generator, comprising a water pipe (1), an iron core (2), a coil (3) and a control circuit wherein said iron core (2) is a ring-form iron core (2) with an air gap (4), a width of said air gap is no more than 6 mm, and said iron core (2) is made up of silicon-steel sheets; said water pipe (1) is plugged into said air gap (4); said coil (3) is placed at both sides of said air gap (4), input and output ends (L1, L2) of said coil (3) are connected with said control circuit, said control circuit is adapted to be connected with a power supply, wherein the current through coil (3) ranges from 0.1 to 1.0 ampere, the magnetic induction intensity at a center of said air gap (4) of said iron core (2) dynamic state ranges from 250 to 2500 gauss and the current frequency of the control circuit is maintained within 50 to 350 hertz, wherein said iron core (2) is made up of non-crystal soft magnetic materials.

* * * * *